United States Patent [19]
Beres et al.

[11] Patent Number: 5,190,767
[45] Date of Patent: Mar. 2, 1993

[54] TIRE MOLD

[75] Inventors: Arthur W. Beres, Akron; Helmut Dernbach, Cuyahoga Falls; Richard A. Raymond, Canton, all of Ohio

[73] Assignee: The Goodyear Tire & Rubber Company, Akron, Ohio

[21] Appl. No.: 727,867

[22] Filed: Jul. 10, 1991

[51] Int. Cl.5 .................. B29C 33/26; B29C 35/00
[52] U.S. Cl. .................. 425/28.1; 425/46; 425/47; 425/54; 425/55; 425/450.1
[58] Field of Search .............. 425/28.1, 46, 47, 54, 425/55, 193, 195, 450.1; 249/170, 171

[56] References Cited
U.S. PATENT DOCUMENTS

| | | | |
|---|---|---|---|
| 3,460,197 | 8/1969 | Cantarutti et al. | 425/47 |
| 3,464,090 | 9/1969 | Cantarutti | 425/47 |
| 3,479,693 | 11/1969 | Cantarutti | 425/47 |
| 3,553,789 | 1/1971 | Allitt | 425/46 |
| 3,847,520 | 11/1974 | Plumhans | 425/47 |
| 3,852,006 | 12/1974 | Irie | 425/47 |
| 3,854,853 | 12/1974 | Mirtain | 425/47 |
| 3,897,181 | 7/1975 | Madaschefsky | 425/47 |
| 3,989,791 | 11/1976 | Tippin | 264/315 |
| 4,035,119 | 7/1977 | Beres | 425/46 |

Primary Examiner—Willard Hoag
Attorney, Agent, or Firm—T. P. Lewandowski; Frederick K. Lacher

[57] ABSTRACT

A tire mold having an upper half, a lower half, and a hinged segmented center ring mounted on the lower half. The center ring has an upper register between the ring and the upper mold half and a lower register between the center ring and the lower mold half to support the center ring during molding. The lower register is provided by engagement of an inclined surface on the center ring with a lower register surface on a ring flange positioned between the hinge axis of each center ring segment and the inclined surface of the segment. The hinge axis is positioned below a lower split plane between the lower mold half and center ring. The height of the ring flange and the inclination of the lower register surface is selected to provide for swinging movement of the center ring segments with the least interference between the center ring and the tire tread during opening of the mold and to provide the maximum support of the center ring segments during molding of a tire.

5 Claims, 3 Drawing Sheets

TIRE MOLD

This invention relates to tire molds and especially to molds having center segments which are moveable radially outward during opening of the mold to facilitate extraction of the tires. This is especially important for molding tires which have tread patterns opposed to the direction of extraction and for tires with deep nonskid treads.

Heretofore hinged center segments have been provided on the lower half of a mold where the width of the segments has been relatively narrow and only one containing outer register was needed. For wider segments, upper and lower outer registers at the upper and lower mold halves have been provided, however, this has necessitated special linkage and grooves in the upper and lower mold halves.

The present invention provides hinged center ring segments with outer registers at the upper and lower mold halves which is especially desirable for wider center ring segments. The outer register for the upper mold half is provided by an upper convex outer surface on each hinged center ring segment and an upper concave inner surface on the upper mold half. The outer register for the lower mold half is provided by a lower convex outer surface on each hinged center ring segment and a lower concave inner surface on a ring flange extending upwardly from the lower mold half. The location of the hinge axis for each center ring segment, the inclination of the lower register and the height of the lower register are such that there is a maximum radial resistance to movement of the center ring segments during molding with a minimum interference between the tire tread and center ring segments during opening of the mold. With the mold of this invention, hinged wide center ring segments can be utilized for molding tires which would otherwise have to be molded in a more complicated segmental mold or a center ring segmental mold costing substantially more than the mold of this invention.

In accordance with one aspect of this invention there is provided a tire mold comprising an upper half and a lower half, each including a sidewall molding portion and a tread molding portion, each tread molding portion terminating at an upper split plane surface and a lower split plane surface spaced from the mid-circumferential plane of the mold, the lower mold half having a plurality of hinge members spaced angularly about the mold axis and mounted on the periphery of the lower mold half, a center ring having a tread molding portion and an upper plane surface in coplanar contact with the upper split plane surface and a lower plane surface in coplanar contact with the lower split plane surface, the center ring comprising a plurality of arcuate segments, each swingably connected, respectively, to hinge members for swinging movement about a hinge axis, the center ring having an upper surface for engagement with an upper register surface on the upper half to provide an upper register and a lower register surface for engagement with a surface of an upstanding ring flange on the lower mold half to provide a lower register, the upstanding ring flange being positioned between each hinge axis and the lower surface of each of the arcuate segments, and the lower register surface being inclined upwardly and radially outward relative to the axis of the mold with each hinge axis being spaced below the lower split plane surface to provide for a swinging movement of each arcuate segment upon opening of the mold.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiments shown and described herein are illustrative and as will become apparent to those skilled in these arts, can be modified in numerous ways within the spirit and scope of the invention as defined in the claims hereof.

IN THE DRAWINGS

Figure 1:
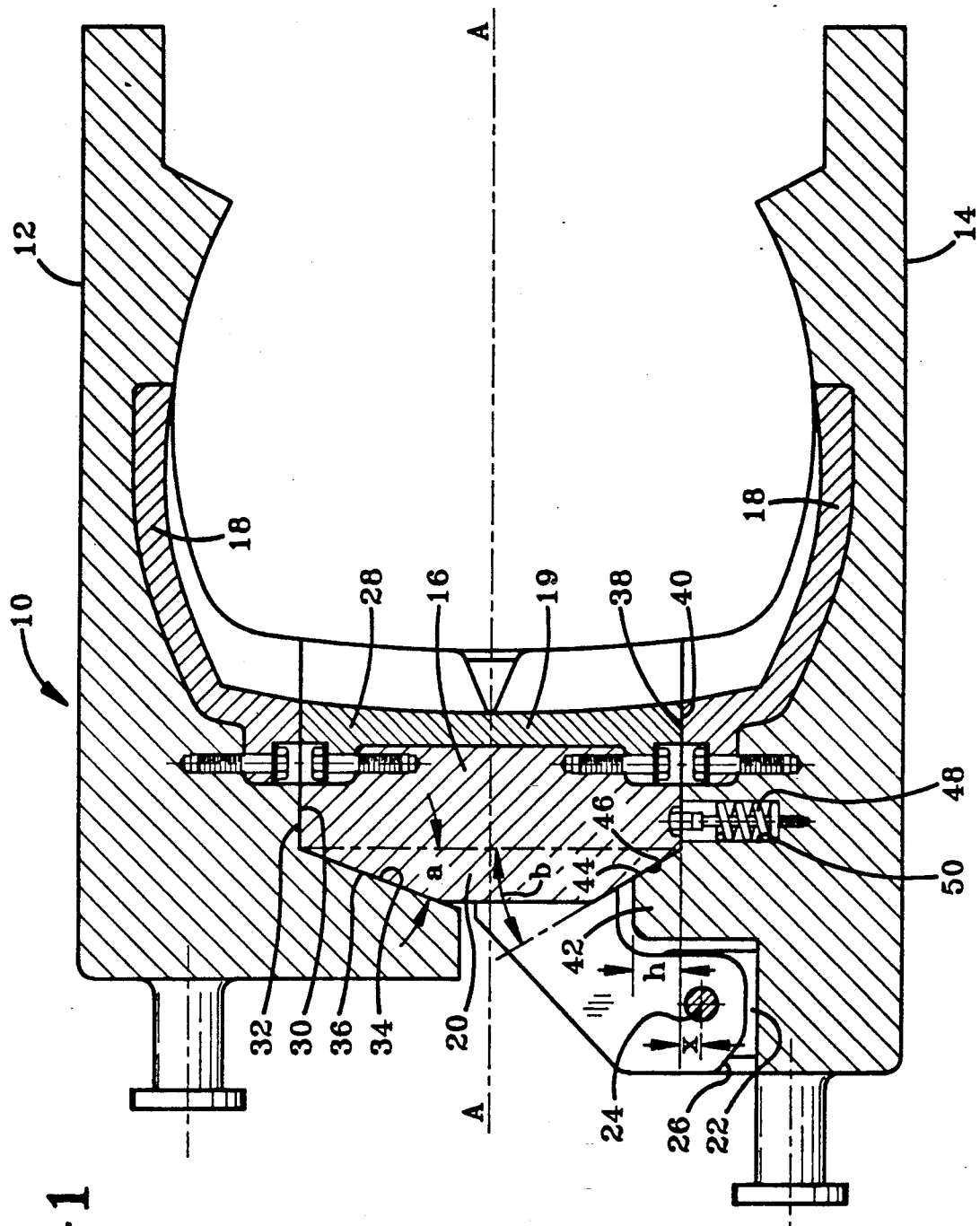
FIG. 1 is a partial elevation, in cross-section, of a tire mold embodying the invention taken along line 1—1 in FIG. 2.

Referring to FIG. 1, a tire mold 10 is shown having an upper mold half 12 and a lower mold half 14 with a center ring 16. The upper mold half 12 and lower mold half 14 may have sidewall inserts 18 and tread inserts 19 which are interchangeable with other inserts for different tires.

The center ring 16 is segmented and each segment 20 has hinge plate members 21 which are hinged on hinge members such as hinge lugs 22 mounted on the outer periphery of the lower mold half 14. Each segment 20 is rotatable around a hinge axis 24 and rotation of the segment is limited by a stop surface 26 on each of the hinge plate members 21 which is engageable with the outer periphery of the lower mold half 14 between the hinge lugs 22. Each segment 20 may have a tread insert 28 which may be interchangeable for different tires. In the present embodiment, the tire mold 10 has 12 segments 20, however, there may be from 9 to 13 depending upon the mold requirements.

The upper mold half 12 has an upper mold split plane surface 30 for engagement with an upper center ring split plane surface 32 spaced from a mid-circumferential plane A—A of the mold. The upper mold half 12 also has an upper mold register surface 34 for engagement in coplanar contact with an upper center ring register surface 36. Preferably the upper mold register surface has a concave conical shape and the upper center ring register surface 36 has a convex conical with a cone surface inclined at an angle a of about 20°.

The lower mold half 14 has a lower mold split plane surface 38 spaced from the mid-circumferential plane A—A for engagement in coplanar contact with a lower center ring split plane surface 40. A ring flange 42 on the lower mold half 14 extends upwardly from the lower mold split plane surface 38 a distance h. This distance h is also the height of the lower register which has a lower mold register surface 44 on the lower mold half 14 and a lower center ring register surface 46 on the ring flange 42. The lower mold register surface 44 has a concave conical surface and the lower center ring register surface 46 has a convex conical surface with the cone surface inclined upwardly and radially outward relative to the axis of the mold at an angle b which in this embodiment is about 30°. The ring flange 42 is preferably positioned between the lower center ring register surface 46 of the center ring and the hinge axis 24. The hinge axis is preferably positioned below the lower mold split plane surface 38 a distance x which in this embodiment is equal to about ⅓ the height h of the ring flange 42 and lower register. The hinge axis 24 of each segment 20 is positioned as close to the outer periphery of the lower mold half 14 as is feasible for the mold size. Spring means in the form of a plurality of compression springs 48 may be disposed in spring seats 50 in the lower split plane surface 38 if desired for facilitating the operation of the mold 10.

Figure 2:
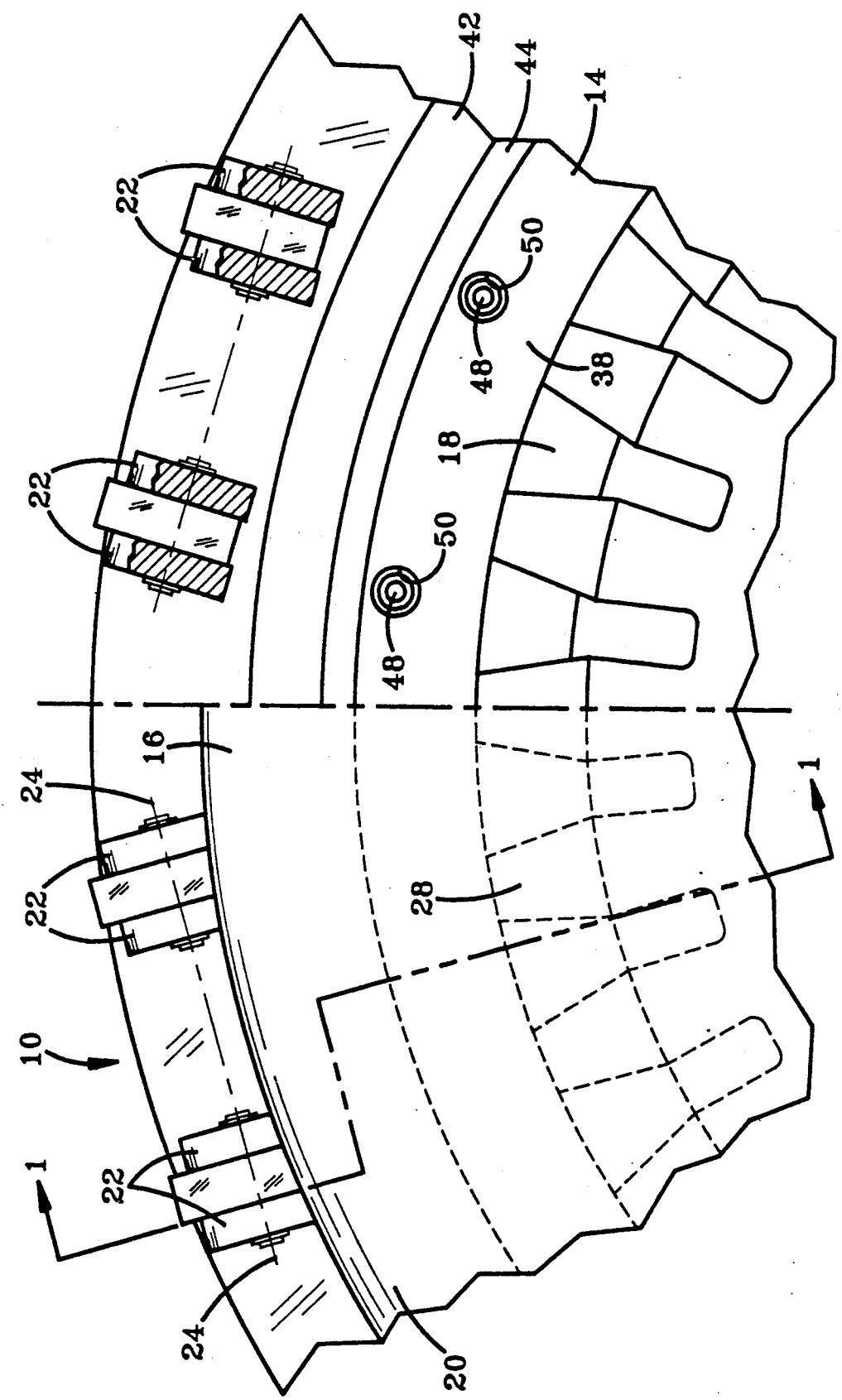
FIG. 2 is a fragmentary plan view of the lower mold half with one of the segments removed to show the ring flange and lower outer register for the lower mold half.

In operation, a tire (not shown) is placed in the lower mold half 14 with the center ring 16 in the position shown in FIGS. 1 and 2. The upper mold half 12 is then lowered to the position shown in FIG. 1 with the upper mold split plane surface 30 in coplanar contact with the upper center ring split plane surface 32 and the lower mold split plane surface 38 in coplanar contact with the lower center ring split plane surface 40. After a final closing force is applied to the mold 10, the compression springs 48 are compressed to the position shown in FIG. 1. Also, the upper mold register surface 34 is in coplanar contact with the upper center ring register surface 36 and the lower mold register surface 44 is in coplanar contact with the lower center ring register surface 46. The tire is then molded at the desired temperature and pressure for the time necessary to cure the tire.

The tire mold 10 is placed in a pot heater (not shown). After completion of the cure cycle, the upper mold half 12 is lifted away from the lower mold half 14. During the movement of the tire upward out of the lower mold half 14, the tread of the tire remains in engagement with the tread insert 28 of the center ring 16 and each segment 20 is pulled upward away from the lower mold half 14. As the center ring 16 is moved upwardly, each segment 20 rotates about the respective hinge axis 24 and moves radially outward away from the tire disengaging the tread insert 28 from the tread of the tire without damaging the tread. This movement may continue until the stop surface 26 engages the lower mold half 14. After the tire is removed, each segment 20 falls back into the position shown in FIG. 1 and this movement may be cushioned by the compression springs 48.

Figure 3:
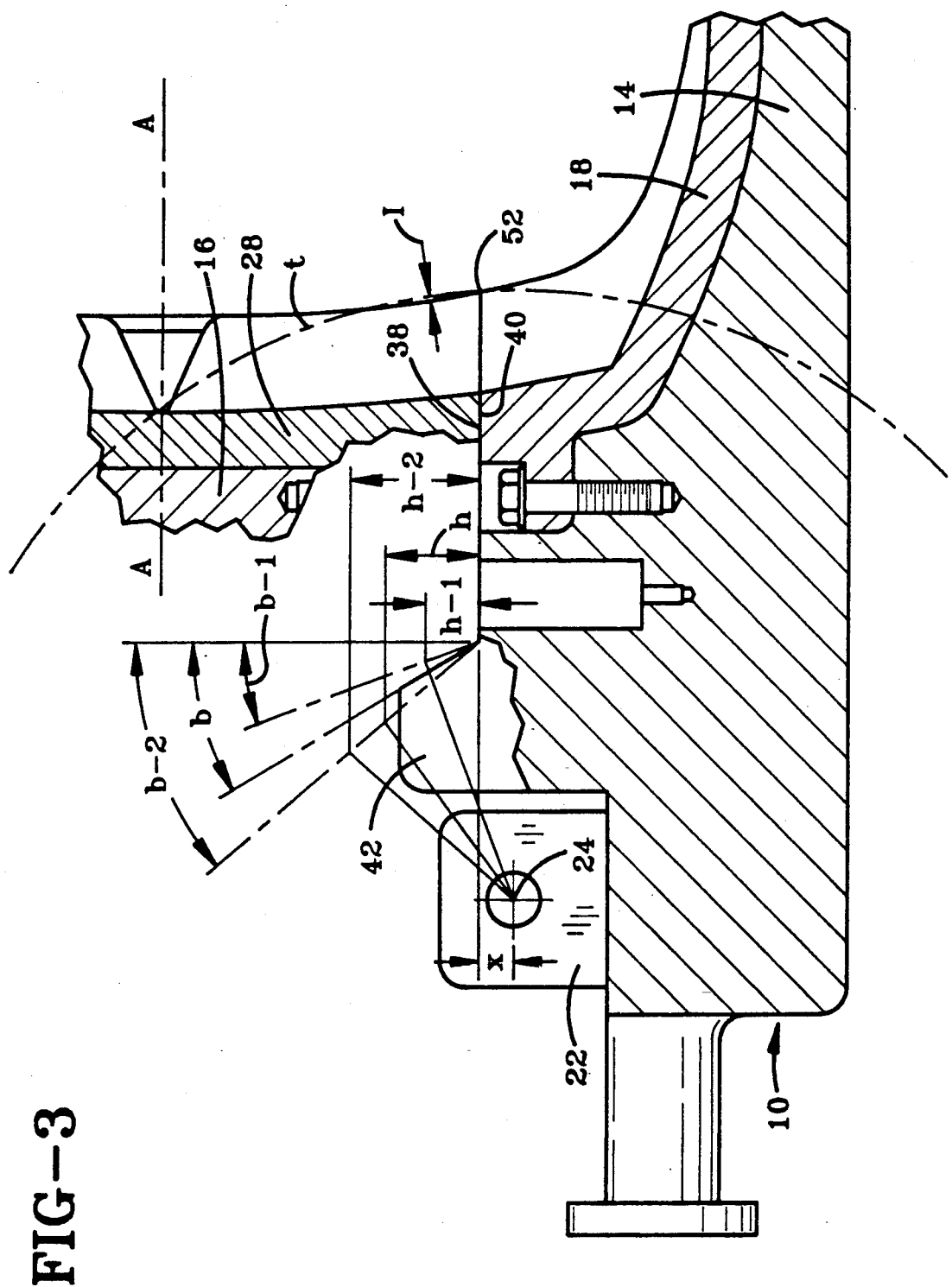
FIG. 3 is a diagrammatic view of the mold shown in FIG. 1 illustrating the different register heights and inclinations of the register surface which can be provided with the segment hinge axis in the preferred position.

Referring to FIG. 3, a diagrammatic view is shown of the embodiment of FIGS. 1 and 2 showing the hinge axis 24 below the lower mold split plane surface 38 a distance x of about ⅓ the height h of the ring flange 42 with the cone surface inclined at an angle b of about 30°. This diagram also illustrates two alternative configurations. In one, the cone surface is inclined at an angle b of about 20°, however this limits the height h−1 of the ring flange 42 to approximately 2 times the distance x the hinge axis 24 is positioned below the lower mold split plane surface 38.

FIG. 3 also illustrates a configuration in which the cone surface is inclined at an angle b-2 of about 40° and the height h-2 of the ring flange 42 is about 3⅜ times the distance x that the hinge axis 24 is below the lower mold split plane surface 38. It therefore can be seen that as the inclination of the cone surface is increased, the height h of the ring flange 42 can be increased. However, at the same time this reduces the effective force provided by the lower mold register surface 44. Accordingly, the preferred inclination of the lower mold split plane surface 38 is 30° which provides a height h of the ring flange of about 3 times the distance x, the hinge axis is spaced from the lower mold split plane surface 38. Also shown in FIG. 3 is the track t of the lower edge 52 of the segment 20 indicating the amount of interference I between the segment surface and a tire tread as the tire is moved upwardly and the segment swings about the hinge axis 24. As long as the hinge axis 24 is below the lower mold split plane surface 38, the interference is minimal. It is evident that moving the hinge axis 24 does affect the possible combinations of ring flange height h and angle b of the cone surface inclination.

It has been found that the construction of this invention is especially suitable for two-piece, center rib tire molds for curing earthmover radial tires.

While certain representative embodiments and details have been shown for the purpose of illustrating the invention, it will be apparent to those skilled in the art that various changes and modifications may be made therein without departing from the spirit or the scope of the invention limited only by the claims.

We claim:

1. A tire mold comprising an upper mold half and a lower mold half, each including a sidewall molding portion and a tread molding portion, each tread molding portion terminating at an upper split plane surface and a lower split plane surface spaced from the mid circumferential plane of the mold, said lower mold half having a plurality of hinge members spaced angularly about the mold axis and mounted on the periphery of said lower mold half, a center ring having a tread molding portion and an upper plane surface in coplanar contact with said upper mold split plane surface and a lower plane surface in coplanar contact with said lower split plane surface, said center ring comprising a plurality of arcuate segments each swingably connected respectively to said hinge members for swinging movement about a hinge axis, said center ring having an upper surface for engagement with an upper register surface on said upper mold half to provide an upper register and a lower register surface for engagement with the surface of an upstanding ring flange on said lower mold half to provide a lower register, said upstanding ring flange being positioned between each said hinge axis and said lower surface of each of said arcuate segments, said lower register surface being inclined upwardly and radially outward relative to the axis of said mold with each said hinge axis being spaced below said lower split plane surface a distance equal to from about 2 to 3⅜ the height of said ring flange to provide for a swinging movement of each said arcuate segment upon opening of said mold.

2. A tire mold in accordance with claim 1 wherein said lower register surface is cone shaped with a cone surface inclined at an angle of from 20° to 40°.

3. A tire mold in accordance with claim 2 wherein said said cone surface is inclined at an angle of about 30°.

4. The tire mold in accordance with claim 3 wherein said hinge axis is positioned below said lower split plane surface a distance about ⅓ the height of the ring flange.

5. A tire mold in accordance with claim 1 wherein said center ring is divided into from 9 to 13 arcuate segments.

* * * * *